United States Patent [19]

Cubbins et al.

[11] Patent Number: 4,908,785

[45] Date of Patent: Mar. 13, 1990

[54] DATA COMPRESSION METHOD FOR TELEMETRY OF VIBRATION DATA

[75] Inventors: Thomas D. Cubbins, Seattle; Thomas R. Hope, Woodinville; John M. Michels, Seattle, all of Wash.

[73] Assignee: The Boeing Company, Seattle, Wash.

[21] Appl. No.: 766,738

[22] Filed: Aug. 16, 1985

[51] Int. Cl.$^4$ .............................................. G06F 15/20
[52] U.S. Cl. .................................. 364/576; 364/572; 364/508; 364/485; 73/583; 73/660
[58] Field of Search ................... 364/715.02, 576, 573, 364/572, 508, 485, 724, 726, 483, 431.08; 381/37, 38, 39; 375/122; 382/56; 340/870.12, 870.13, 825; 73/583, 660

[56] References Cited

U.S. PATENT DOCUMENTS

| | | | |
|---|---|---|---|
| Re. 31,750 | 11/1984 | Morrow | 364/508 |
| 2,763,840 | 9/1956 | Pleger | 333/17 R |
| 3,462,555 | 3/1966 | Presti | 381/35 |
| 3,471,648 | 10/1969 | Miller | 381/37 |
| 3,620,069 | 1/1969 | Cole | 73/583 |
| 3,641,550 | 2/1972 | Lynas et al. | 73/583 |
| 3,742,395 | 6/1973 | Yoneyama | 381/29 |
| 3,758,758 | 9/1973 | Games et al. | 73/583 |
| 3,936,611 | 2/1976 | Poole | 381/34 |
| 3,959,592 | 5/1976 | Ehrat | 381/38 |
| 4,081,749 | 3/1978 | Peterson | 370/109 |
| 4,157,457 | 6/1979 | Sakoe et al. | 364/485 |
| 4,408,285 | 10/1983 | Sisson et al. | 364/508 |
| 4,480,480 | 11/1984 | Scott et al. | 73/769 |
| 4,488,240 | 12/1984 | Kapadia et al. | 73/583 |
| 4,553,213 | 11/1985 | Hyatt | 364/514 |

*Primary Examiner*—Parshotam S. Lall
*Assistant Examiner*—Ellis B. Ramirez
*Attorney, Agent, or Firm*—John C. Hammar

[57] ABSTRACT

Vibrational data is compressed about 8.5 to 18 times by isolating a low frequency component from the signal, frequency analyzing the signal to obtain important frequency/amplitude data, and recombining the low frequency component with the analyzed information for efficient transmission.

19 Claims, 1 Drawing Sheet

DATA COMPRESSION METHOD FOR TELEMETRY OF VIBRATION DATA

TECHNICAL FIELD

The present invention relates to a method for compressing the data attributed with vibration of structural components in missiles to facilitate convenient transmission of the meaningful data from the missile to the ground for vibrational analysis.

BACKGROUND ART

During the flight testing of missiles, vibration sensors (transducers) measure the vibrating motion at selected locations on the missile. These measurements are generally transmitted to a ground station for subsequent analysis. Sample rates for the power spectral density (PSD) vibration data typically range between 10,000 to 50,000 samples per second. When the samples are digitally quantized to 8 bits, the telemetry system must allocate 80,000 to 400,000 bits per second of telemetry capacity to each vibration sensor. The required telemetry capacity becomes excessive when more than three transducers are used. A typical flight test requires twenty or more sensors at different test points on the missile, however, to provide adequate details about vibration modes. Therefore, a data compression procedure which retains adequate resolution of vibrational frequencies is needed.

Since transmission of the uncompressed vibration data would require telemetry equipment that would impose severe weight penalties upon the missile, several alternatives to compress the data have been suggested. For example, in U.S. Pat. No. 3,094,692, Westneat et al. suggests statistical telemetering of high frequency vibration data from a missile after on-board processing to extract PSD features, correlation functions, and features of the amplitude probability distribution. Significant information is lost or sacrificed by assuming that the statistical data adequately characterizes all the sources of vibrations. The entire signal is analyzed to extract features associated with high frequency vibrations that can be characterized as random functions. Raw data, particularly low frequency data, is not transmitted.

Another similar method analyzes the entire raw signal to determine the amount of signal power that resides in each of a predetermined set of frequency bands within the total bandwidth. A common set of bands is a logarithmic progression of the center frequency, and is achieved with a suitable analog or digital filter. The filters provide a bandwidth at each band which is proportional to the frequency. One-third and 1/6 octave bands are commonly used.

This compression method often fails to provide sufficient resolution for accurate determination of the important frequency components of the spectral components of the vibration data. The compression is too coarse. Maximum band separation at each filter in the bandwidth makes interpolation between bands difficult and crude. Thus, the frequency can only be determined to within an accuracy related to the bandwidth of the particular band. Furthermore, if two important frequencies are within a signal band both contribute to the vibration, but only the combined power will be measured. In this way, important information can be lost or masked.

SUMMARY OF THE INVENTION

Having determined that dominant structural bending modes exist in the low frequency range nominally below about 600 Hz (depending upon the missile dimensions and structural stiffness), we have found that it is important to transmit this low frequency data intact to allow optimal analysis of the sources of vibration. At higher frequencies, such as from 600–10,000 Hz, effects due to shock, excitation, structural discontinuities, and vibration of structural appendages can be adequately characterized by the temporal history of the signal amplitude distribution of resonance patterns. This data, incident in the high frequency portion of the signal, can readily be analyzed on board the missile in $\frac{1}{3}$ octave, 1/6 octave, or DFT or FFT spectral analysis of the entire raw signal, as in the prior art. A significantly reduced telemetry bandwidth results. Detailed structural analysis can still be conducted, however, since the low frequency data and processed or compressed data still possess the meaningful information necessary to isolate all important, high and low frequency vibration sources.

The present invention achieves data compression ratios of between about 8.5–18 over transmission of the raw signal by dividing the input vibration signal into high and low frequency segments, by transmitting the low frequency component intact, and by performing spectral analsis on board on the raw signal to obtain a frequency/amplitude component. The frequency/amplitude component can be multiplexed with the low frequency data for transmission in an efficient manner.

BEST MODE CONTEMPLATED FOR CARRYING OUT THE INVENTION

Figure 1:
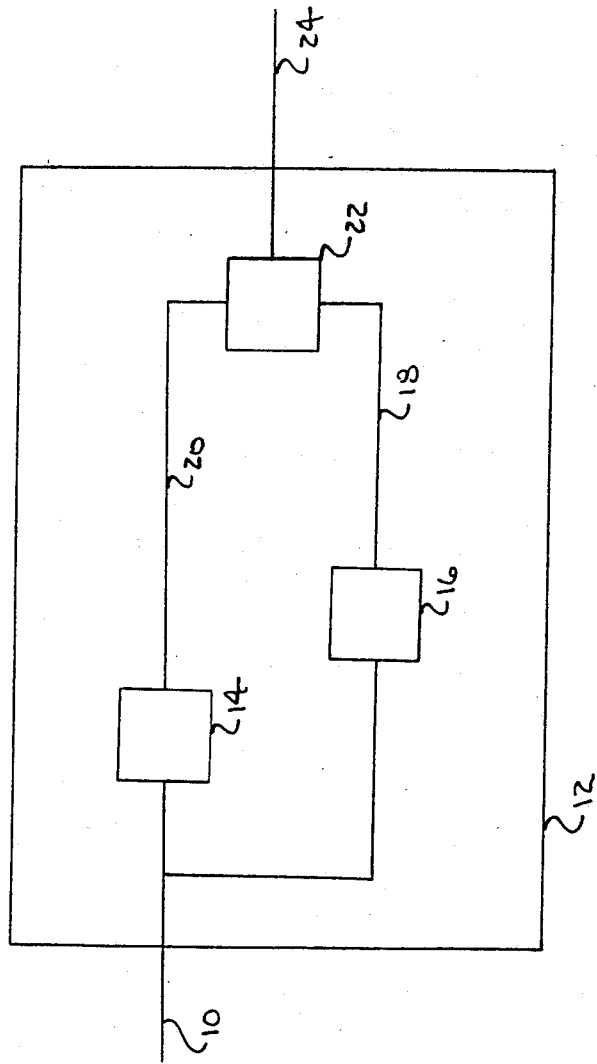
FIG. 1 is a schematic block diagram of the data compression hardware of the present invention.

As shown in FIG. 1, raw vibration data 10 at a sample rate of about 20,000 samples/sec from one or more strain gauges 8 enters a data compression processor 12 for on-board processing prior to transmission. In an analog or digital filter 14, the low frequency data 20 is extracted from the raw signal 10. A parallel signal enters a spectral frequency analyzer 16 where the signal is compressed by $\frac{1}{3}$ octave, 1/6 octave, or Fourier Transform spectral analysis (DFT or FFT) to isolate the important PSD statistical frequency data 18 incident in the raw signal 10, and which is suitable to identify high frequency vibrations. The uncompressed low frequency component 20 up to about 600 Hz is not processed further, but enters a multiplexer 22 for recombining with the frequency data 18. The resulting signal 24 is ready for transmission, and is compressed between 8.5 to 18 times from the raw signal 10. This transmission signal 24, however, includes all the important data on vibrational modes, allowing a high resolution and accurate analysis of the data at the ground station to identify the important contributions to the vibration.

The vibration spectral range may be, for example, from 20 to 4000 Hz with a sample frequency of 20,000 samples/sec. The 20–600 Hz band can be telemetered as the low frequency data 20 at a sample rate of 1000 to 2000 samples per second. The raw signal 10 band can be analyzed simultaneously as 10 frequency/amplitude values in $\frac{1}{3}$ octave, 20 values in 1/6 octave bands, or 35 values from DFT analysis at a uniform bandwidth of 100 Hz. For an update rate of 10 per second for the high frequency component, the resulting compression ratios range between 8.5 and 18.

Analysis of this nature provides (1) an amplitude/frequency approximation of the true signal for the entire bandwidth and (2) the complete low frequency component of the raw signal.

Filtering can be achieved by digital means to achieve sharp cut-off response. Digital filtering in microprocessor elements, using conventional megabyte rate processors, also provides the flexibility of reprogramming to different frequency splits, if desired. Channeling the raw signal in a parallel filter bank allows the bandwidth to be split into the components of interest, and reduces the processing time, since frequency separation is achieved simultaneously.

While preferred embodiments have been shown and described, those skilled in the art will readily recognize alterations, modifications, or variations which might be made to these embodiments without departing from the inventive concept. The invention should be construed liberally in view of these embodiments to cover their full range of equivalents. The claims should be construed liberally in view of the description, and should not be limited to an embodiment unless such limitation is necessary in view of the pertinent prior art.

We claim:

1. A method for compressing vibration data for telemetry from a missile or spacecraft while allowing complete assessment of important vibration modes, comprising the steps of:
   (a) sensing the missile vibration at a predetermined sample rate with at least one strain gauge to generate raw vibration data;
   (b) splitting the signal into a first and a second signal path, the paths being electrically connected in parallel;
   (c) filtering the raw vibration data in the first signal path to obtain an uncompressed low frequency component suitable for transmission;
   (d) frequency analyzing the data in the second signal path into compressed frequency/amplitude data suitable to identify sources of high frequency vibrations; and
   (e) multiplexing the compressed frequency/ amplitude data with the low frequency component without further signal processing of either component to provide a mixed signal, the mixed signal being compressed from the raw signal and being suitable for efficient transmission.

2. The method of claim 1 wherein the frequency analysis includes parallel bank filtering of the raw signal to enhance the speed of analysis.

3. The method of claim 1 wherein the frequency analysis includes isolating frequency/amplitude data on a 1/3 octave basis.

4. The method of claim 1 wherein the low frequency—high frequency split is at about 600 Hz.

5. The method of claim 1 wherein the data sample rate is about 20,000 samples/sec.

6. The method of claim 1 wherein the frequency analysis includes isolating frequency amplitude data on a 1/6 octave basis.

7. The method of claim 1 wherein the vibration data has a bandwidth of about 0-10,000 Hz, the uncompressed low frequency component has a maximum frequency of about 600 Hz, the sample rate is about 20,000 samples/sec, and the compression ratio is between about 8.5-18.0.

8. The method of claim 7 wherein the spectral analysis uses Fast Fourier Transform spectral analysis.

9. The method of claim 1 wherein the frequency analysis includes Fourier Transform spectral analysis.

10. The method of claim 9 wherein the spectral analysis uses DFT.

11. The method of claim 9 wherein the spectral analysis uses FFT.

12. A telemetry data compression system for compressing vibration data generated on a missile or spacecraft, comprising:
   (a) means for sensing the vibration and for creating a vibration signal at a predetermined sample rate;
   (b) means for splitting the vibration signal into a first and second signal path, the paths being electrically connected in parallel;
   (c) a filter along the first path to isolate a low frequency component from the vibration signal;
   (d) a frequency spectral analyzer along the second path for analyzing the parallel vibrational signal into an analyzed component having frequency/amplitude bands across the signal bandwidth, the bands being representative of the important vibrational modes contained within the signal; and
   (e) a multiplexer connected to the filter and the analyzer for combining the low frequency component with the analyzed component for transmission of the compressed data without further signal processing of either component.

13. The system of claim 12 wherein the frequency spectral analyzer performs DFT Fourier Transform analysis.

14. The system of claim 12 wherein the filter isolates a low frequency component having a maximum frequency of about 600 Hz.

15. The system of claim 12 wherein the sample rate for the vibrational signal is about 20,000 samples/sec.

16. The system of claim 12 wherein the frequency spectral analyzer preforms FFT Fourier Transform analysis.

17. The system of claim 12 wherein the frequency spectral analyzer includes means for analyzing the signal using Fourier Transform analysis, wherein the filter isolates a low frequency component having a maximum frequency of 600 Hz, and the sample rate is about 20,000 samples/sec.

18. The system of claim 12 wherein the means for sensing has a bandwidth of about 0-10,000 Hz, the sample rate is about 20,000 samples/sec, the low frequency component has a maximum frequency of about 600 Hz, the analyzer uses a method selected from the group consisting of parallel bank filtering, Discrete Fourier Transform analysis, or Fast Fourier Transform analysis to prepare the analyzed component.

19. The system of claim 18 wherein the means for sensing includes at least one strain gauge, and wherein the system achieves a compression ratio of between about 8.5-18.0.

* * * * *